(12) United States Patent
Hernandez

(10) Patent No.: US 8,441,144 B1
(45) Date of Patent: May 14, 2013

(54) SYSTEM FOR REGULATING CURRENT FLOW TO A PLURALITY OF ELECTRICAL DEVICES

(76) Inventor: Maurilio G. Hernandez, Chicago, IL (US)

(*) Notice: Subject to any disclaimer, the term of this patent is extended or adjusted under 35 U.S.C. 154(b) by 475 days.

(21) Appl. No.: 12/843,502

(22) Filed: Jul. 26, 2010

(51) Int. Cl.
*H02J 1/10* (2006.01)

(52) U.S. Cl.
USPC .......................................................... 307/18

(58) Field of Classification Search ............... 307/18
See application file for complete search history.

(56) References Cited

U.S. PATENT DOCUMENTS

| | | | |
|---|---|---|---|
| 4,729,375 A * | 3/1988 | Jegers et al. ............... 607/91 |
| 5,424,903 A | 6/1995 | Schreiber | |
| 5,731,763 A | 3/1998 | Herweck et al. | |
| 6,211,581 B1 | 4/2001 | Farrant | |
| 6,633,472 B2 | 10/2003 | Lai | |
| 6,643,566 B1 | 11/2003 | Lehr et al. | |
| 6,666,712 B1 | 12/2003 | Kramer | |
| 6,735,096 B2 | 5/2004 | Chang et al. | |
| 6,811,444 B2 | 11/2004 | Geyer | |
| 7,057,108 B1 * | 6/2006 | Sodemann et al. ......... 174/71 R |
| 7,081,827 B2 | 7/2006 | Addy | |
| 7,152,168 B2 | 12/2006 | Boynton et al. | |
| 7,294,940 B2 | 11/2007 | Grolnic et al. | |
| 7,498,692 B2 | 3/2009 | Grolnic et al. | |
| 7,612,470 B2 | 11/2009 | Pincu et al. | |
| 7,977,825 B2 * | 7/2011 | Gilbert ..................... 307/131 |
| 8,093,753 B2 * | 1/2012 | Lee et al. .................. 307/41 |
| 2007/0071257 A1 | 3/2007 | Bear et al. | |
| 2007/0161293 A1 * | 7/2007 | Ewing et al. ............ 439/620.26 |
| 2008/0179956 A1 | 7/2008 | Jiang et al. | |
| 2008/0272655 A1 | 11/2008 | Vaughan et al. | |
| 2009/0189451 A1 | 7/2009 | Roepke | |
| 2009/0236913 A1 | 9/2009 | Mariasis et al. | |

* cited by examiner

*Primary Examiner* — Daniel Cavallari
(74) *Attorney, Agent, or Firm* — Malloy & Malloy, P.L.

(57) ABSTRACT

A system for selectively regulating current flow to a plurality of electrical devices, being at least partially operative by wireless remote control and including a control assembly connected to at least a first power input and a second power input. The control assembly includes a plurality of outlet sections, each including at least one outlet structured to electrically connect an electrical device to either the first or second power inputs. A timing assembly is operatively structured for time based regulation of current flow from one of the power inputs to one of the outlet sections, wherein another outlet section includes switching capabilities structured to selectively establish a current flow connection with either the first or second power input. A receiver assembly is operatively connected to at least the timing assembly and structured for wireless, operative activation with a remote transmitting unit.

24 Claims, 3 Drawing Sheets

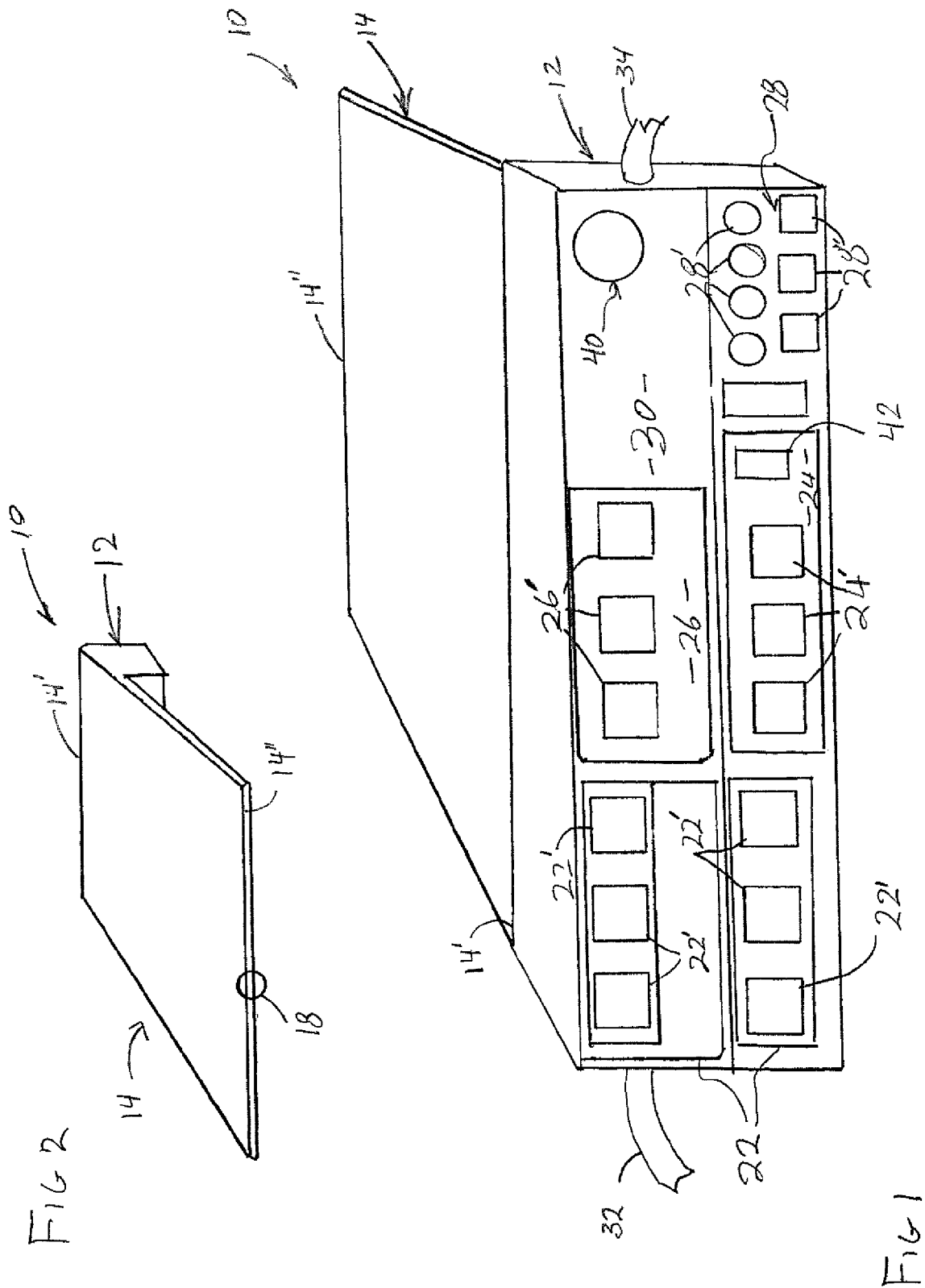

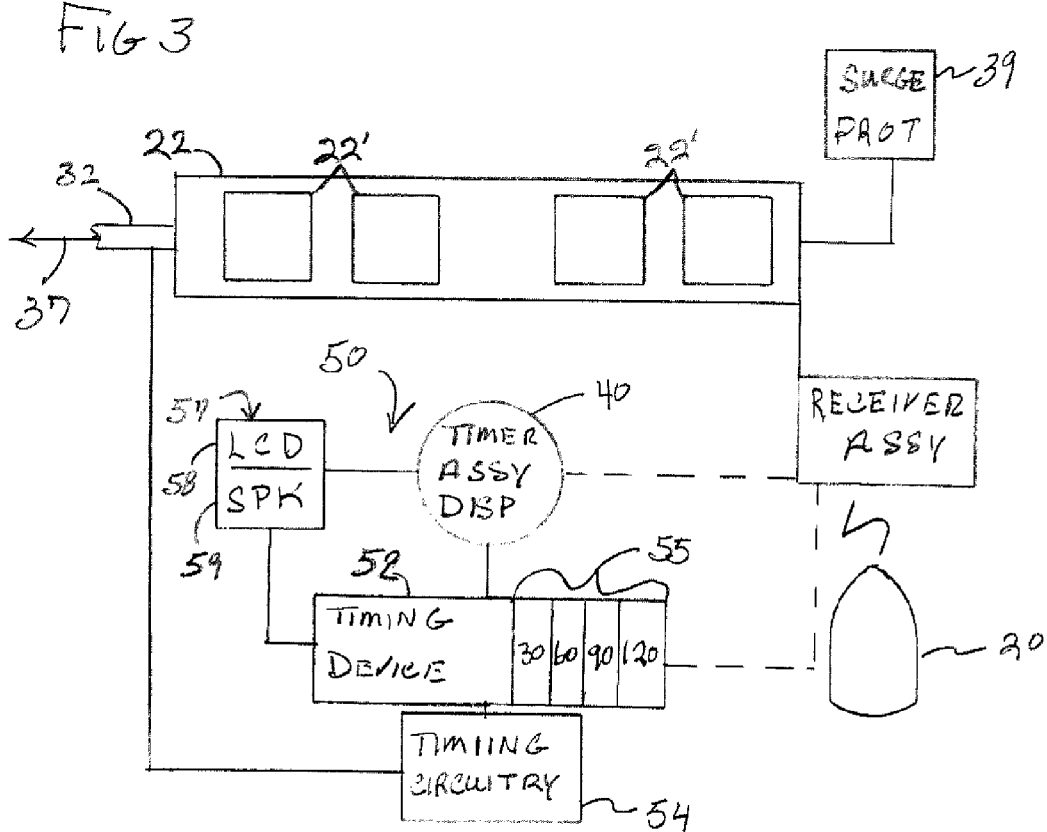
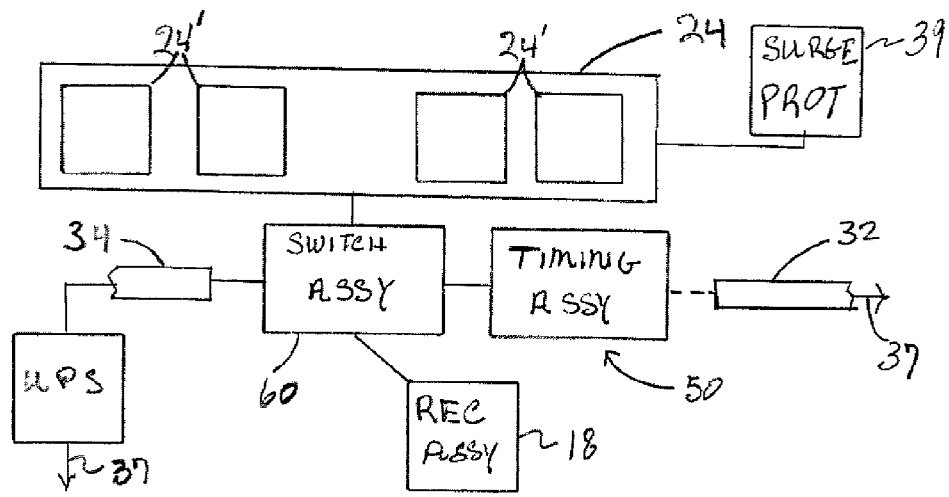

SYSTEM FOR REGULATING CURRENT FLOW TO A PLURALITY OF ELECTRICAL DEVICES

BACKGROUND OF THE INVENTION

1. Field of the Invention

This invention is directed to a system for selectively and automatically regulating current flow to a plurality of electrical devices primarily, but not exclusively, utilizing wireless remote control communication. A control assembly is connected to first and second power outputs and includes a plurality of outlet sections, each of which include at least one outlet. A timing assembly is structured for time based regulation of current flow from one of the power inputs to at least one of the plurality of outlet sections, wherein current flow to this one section is automatically terminated upon the uninterrupted expiration of a given, preset period of time.

2. Description of the Related Art

Various types of electrical devices, such as those associated with home entertainment centers, computer peripherals, as well as larger kitchen type appliances are known to be operated at least partially through the use of wireless, remotely controlled activating signals generated by infrared and/or radio frequency transmission systems. As such, the various electrical devices or peripherals may be controlled from a convenient location rather than directly approaching and manually manipulating the device or appliance. Similarly, known or conventional current regulating assemblies may also include automatic time related "cutoff features" such as a "sleep timer" associated with many if not most modern television sets.

However, operation and activation of such facilities typically are incorporated within the electrical device or appliance itself, wherein the device or appliance is activated in terms of volume control, station/channel and on/off mode through the transmission of various activating signals to a receiving device built into the device. Further, the limitation of wall sockets throughout a given commercial or domestic environment often requires the use of "power strips", wherein a plurality of outlets are integrated into a common bank or strip which is interconnected by a cable to a single outlet. The versatility and concurrent powering of a plurality of devices, specifically including components of an entertainment center, is facilitated. Typical capabilities of such power strips normally include a surge protector. As conventionally structured and used, a surge protector or surge suppresser is designed to protect connected electrical devices from spikes in voltage. As such, a surge protector attempts to regulate current or voltage supply to an electrical device by blocking or shorting to ground, voltages above a safe threshold.

However, absent from this field are power regulating assemblies structured to remotely control the delivery of current to a plurality of electrical devices by means of a single standard or universal remote transmitting unit operatively associated with a single receiver assembly. As such, there is a need for a preferred system which would not be directly associated with the plurality of devices themselves. As such, a proposed regulating system would not require the utilization of a plurality of different remote control devices, each specifically structured for the operation of a different individual electrical device. Instead, such a preferred and proposed control or regulating system could have a control assembly interconnected to a plurality of different power inputs and a plurality of different power outlets and preferably include a timing assembly. The included timing assembly could also include an appropriate timing device and/or circuitry operatively structured for a time based regulation of current flow to at least some of the plurality of different outlets each connected to a different electrical device.

As such, a preferred and proposed current control assembly would be operative to regulate current flow to a relatively large number of peripherals, electrically powered devices and/or appliances at least to the extent of partially incorporating electrical current saving features by remotely and/or automatically terminating a current flow connection to one or more of the devices concurrently upon the expiration of a predetermined time period. Finally, such a device would be economically advantageous through the aforementioned current saving characteristic and be easily operable through the use of a standard wireless remote control unit. As such, the acquisition and utilization of a plurality of different wireless, remote transmitting and receiving units, each associated with a different one of the plurality electrical devices, would be eliminated.

SUMMARY OF THE INVENTION

The present invention is directed to a system for selectively and/or automatically regulating current flow to a plurality of different electrical devices such as, but not limited to, a plurality of peripheral devices which may be associated with an entertainment center, computer or processing station, etc. The system includes a control assembly connected to at least a first power input and a second power input. The control assembly includes a plurality of outlet sections each of which include at least one, but more practically a plurality of outlets each structured to electrically connect one of the aforementioned electrical peripheral devices to a predetermined one of the first or second power inputs. Moreover, each of the plurality of outlet sections will comprise surge protection capabilities, such as provided by an appropriate set of metal oxide varistors (MOV) of the type conventionally structured to conduct electricity to a ground line, also associated with the control assembly of the present invention.

In addition a timing assembly includes appropriate circuitry, as well as a timing device collectively operative to facilitate a "time based" regulation of current flow between a predetermined one of the power inputs and the connected peripheral devices. As such, electrical current flow from the first power input to at least one of said plurality of outlet sections, such as a first outlet section, can be automatically terminated upon the expiration of a predetermined length of time of non-use. However, the timing assembly and the timing circuitry associated therewith comprise reset capabilities operative with a remotely activated receiver assembly to reestablish a predetermined time period during which current flow will be terminated, unless the receiver assembly detects or receives any one of a plurality of different activating signals from a remote transmitting unit.

As described in greater detail hereinafter, the transmitting unit may be a standard and/or universal remote control device commonly used for the remote control, activation, operation, etc. of a plurality of electrical devices including entertainment devices, computer peripherals, appliances, etc. Similarly, the aforementioned receiver assembly will be cooperatively structured with the transmitting unit to detect and/or receive an activating signal transmitted from the remote control unit, such as by infra red (IR) or radio frequency (RF) transmissions.

Accordingly, the timing assembly and associated timing circuitry is structured to define a variable range of predetermined time periods comprising a plurality of preset lengths of time such as, but not limited to, 30 minutes; 60 minutes; 90 minutes; 120 minutes; etc. In addition, the preset capabilities of the timing assembly are operable, by virtue of being operatively connected to the receiver assembly, to reestablish a predetermined time period upon the receiver assembly detecting or receiving an activating signal from the remote transmitting unit. Therefore, once such an activating signal is detected or received by the receiving assembly, the reset capabilities are structured to reset the timing device to the original or last preset time such as, but not limited to (30 minutes; 60 minutes; 90 minutes; etc.).

A different or second one of the plurality of outlet sections of the control assembly includes switching capabilities structured for selective current flow connection with said first power input or said second power input. Accordingly the receiver assembly and remote transmitting unit may interact with the switching capabilities of the second outlet section, such that it will be connected to the first power input. As such the second outlet section and the one or more outlets associated therewith will be subject to the aforementioned "time based" regulation of current flow from the first power output. In contrast, when the second outlet section is powered by the second power input, the one or more outlets associated therewith will remain "un-switched" so as to establish a continuous current flow connection with the electrical devices, peripherals, etc. connected to the second outlet section. Moreover, in order to maintain such a continuous current flow connection, the second power inlet may also be directly associated with an uninterruptible power source (UPS). As a result any problems or disadvantages associated with a power failure will be overcome.

In addition to the above, the plurality of outlet sections further includes an additional or third outlet section, which in one preferred embodiment of the present invention is electrically connected to the second power input. In order to facilitate and maintain a continuous current flow connection to the one or more outlets of the third outlet section, as generally set forth above, it is again emphasized the second power input may be directly associated with a UPS. Moreover, the third outlet section comprises at least one "unswitched" outlet structured to establish and maintain a current flow connection from the second power input and a corresponding peripheral or electrical device connected thereto.

In at least one preferred embodiment of the control system of the present invention, the plurality of outlet sections also includes a supplementary outlet section including a plurality of outlets independently structured for connection either to a coaxial cable or an incoming telephone line. As such, the outlets associated with the supplementary outlet section will also enjoy surge protection capabilities such as provided by an MOV.

Additional features of the system of the present invention include the hardware structure in which it is embodied. More specifically, one preferred embodiment of the present invention comprises a housing dimensioned and configured to encase the operative components of at least the control assembly including, but not limited to, the timing circuitry, timing device, etc. associated with the timing assembly as well as the switches, indicators, and other operative circuitry and components associated with the operation of the plurality of outlet sections and the connection and switching capabilities relating to the first and second power inlets. Moreover, each of the outlet sections and more specifically each of the one or more outlets associated with each outlet section are located in an exteriorly exposed position. As such, the various electrical devices can be efficiently connected to intended or appropriate ones of the outlets of each of the plurality of outlet sections.

Other structural features associated with the housing may include a physical representation and/or display of the timing assembly in the form of a manually or remotely operated timing device. Moreover, the timing device may include a selector, which facilitates an initial and subsequent, manual or automatic, selection of the preset lengths of time of operability of the one or more plurality of outlet sections. More specifically, these preset times, as set forth above, define the aforementioned variable ranges of time periods which may be selected before current flow from the at least first power input is terminated to the one or more outlet sections connected thereto. However, as set forth in greater detail hereinafter, the timing assembly includes reset capabilities which prevent expiration of the preset time and allow the corresponding time period to be reestablished or "reset".

In addition, at least one preferred embodiment of the present invention includes a mounting structure having one side or other appropriate portion connected to the housing and extending outwardly therefrom preferably into a planar configuration. As such, the planar configuration of the mounting structure is sufficiently dimensioned to dispose the housing and the receiver in a predetermined, operative orientation on any of a variety of different supporting structures such as a shelf, electrical device being powered, or other supporting structure. Further, the receiver assembly may be connected in an exteriorly exposed position on the mounting structure. The preferred disposition of the receiver assembly, when in the aforementioned operative orientation, is such as to face inwardly towards the area in which the remote transmitting unit is located. The receipt or detection of activating signals by the receiver assembly transmitted from the remote transmitting unit is thereby further facilitated.

Accordingly, the system for regulating current flow to a plurality of different electrical devices in accord with the operational and structural features of the present invention overcomes many of the disadvantages and problems associated with known or conventional control systems known in this area. Further the system of the present invention demonstrates greater versatility in operation and structure and includes inherent power saving features which are a benefit to the user as well as the community at large.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1 is a perspective view of a housing and mounting structure associated with the current regulating system of the present invention.

FIG. 2 is a perspective view of an opposite side of the housing and mounting structure of the embodiment of FIG. 1.

FIG. 3 is a schematic representation of operative components of the embodiment of FIGS. 1 and 2 as utilized with a wireless transmitter unit or remote control.

FIG. 4 is a schematic representation in block diagram form of additional operative components of the embodiment of FIGS. 1 through 3.

Like reference numerals refer to like parts throughout the several views of the drawings.

DETAILED DESCRIPTION OF THE PREFERRED EMBODIMENT

Figure 5:
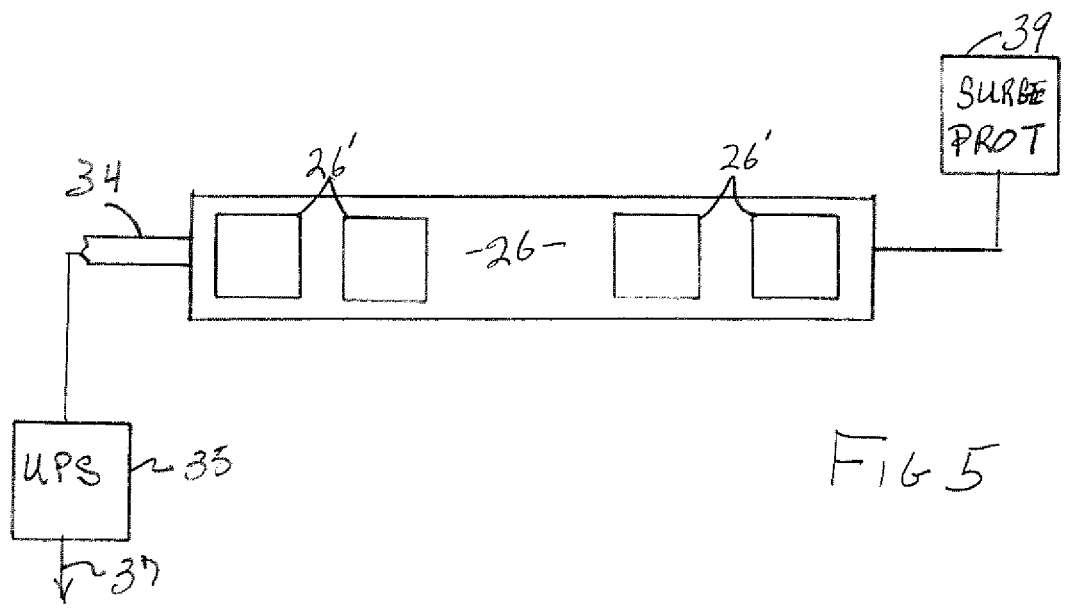
FIG. 5 is a schematic representation of yet additional operative components of the embodiment of FIGS. 1-4.

The present invention is directed to a system for regulating the flow of electrical current to a plurality of electrical devices such as, but not limited to, audio and video components associated with an entertainment center, peripherals associated with a computer station. Moreover, the system of the present invention can be used to regulate the delivery of current to a wide variety of electrically powered devices especially, but not exclusively, wherein such devices are utilized concurrently or as an overall assembly, such as in the aforementioned entertainment center.

Therefore, the regulating system of the present invention is embodied in a console or hardware component generally indicated as 10 in FIGS. 1 and 2. The component 10 includes a housing generally indicated as 12 and a mounting structure, generally indicated as 14, secured to the housing. Moreover, the housing 12 is structured for the containment of at least a part of a control assembly, which comprises many of the various operative components of the system and which is structured to be operated, at least partially, by wireless remote control. However, as described hereinafter and represented in the accompanying Figures at least some of the components and corresponding operative features may also be controlled manually.

Accordingly, the system of the present invention includes a receiver assembly 18 which may be structured to operate in either an infrared (IR) or radio frequency (RF) mode. As such, the receiver assembly 18 is cooperatively structured to receive and/or detect any of a plurality of different activating signals generated by a remote, wireless transmitting unit 20, such as schematically represented in FIG. 3. As will be further emphasized, the wireless, transmitting unit 20 may be in the form of a universal and/or standard remote control of the type commonly used to operate and/or activate various components of an entertainment center. Moreover, the remote control transmitter unit 20 is capable of generating activating signals to regulate the various operative features of the various components of an entertainment center such as, but not limited to, volume, channel or station changing, on/off mode, etc. Further, the receiver 18 is operative with the transmitting unit 20 to detect and/or be receptive of a variety of different activating signals such as of the type which regulate the various operative features of television, entertainment center, etc. including volume, on/off mode, channel changing, etc. As a result, the receiver assembly 18 and the transmitter unit 20 are structured to control and/or operate various other components of the current regulating system of the present invention upon receipt of any one of the aforementioned type of activating signals. Therefore the receiver assembly 18 is not limited to the control of such additional components only upon the receipt of a specialized, customized or dedicated activating signal.

As set forth above, the control assembly and the various operative components and attendant circuitry is encased or retained within the housing 12. With primary reference to FIG. 1, the control assembly includes a plurality of outlet sections 22, 24, 26 and 28. In the represented preferred embodiment of the control assembly and in particular the housing 12, a plurality of four outlet sections, 22-28, are represented. However, it is emphasized, that a different number of outlet sections may be incorporated in the control assembly, wherein each such outlet section 22-28 is disposed in an exteriorly accessible position on an exposed face or panel 30 of the housing 12. In addition, each of the plurality of outlet sections 22-28 include at least one, but more practically, a plurality of outlets as at 22', 24', 26' and 28'. Moreover, each of the one or more outlets 22'-28' associated with corresponding ones of the outlet sections 22-28 are structured to facilitate electrical connection of any one of a plurality of electrically powered devices, of the type generally set forth above to a predetermined power input.

As such, an electrical current flow connection is established between the connected electrical devices (not shown for purposes of clarity) and at least one of two power inlets 32 and 34. Each of the power inlets 32 and 34 may be connected to a conventional wall socket or other appropriate outlet to which electrical current is supplied, such as by a utility company. However, as schematically represented in the embodiment of FIG. 4, at least a second power inlet 34, of the two power inlets 32 and 34, is connected to and otherwise operatively associated with an uninterruptible power supply (UPS) as at 35. In turn, the UPS and the second power input 34 are primarily powered by the aforementioned conventional power source, such as being connected to a wall outlet as at 37.

As set forth above, the exposed panel or face 30 of the housing 12 is positioned so as to provide clear, exterior access to each of the one more outlets 22'-28' associated with each of the plurality of outlet sections 22-28. In addition, the exposed panel or face 30 of the housing 12 includes additional operative features such as a timing assembly display as at 40 described in greater detail with primary reference to FIG. 3. Also, a switching assembly includes an exposed switch or like or member 42. The switch 42 may be manually operated and/or controlled by the aforementioned remote, wireless transmitter unit 20, as explained in greater detail with reference to the schematic representation of FIG. 4. Moreover, the display panel 30, housing 20 and hardware component 10 may include additional operative and structural features contained within the housing 12 or at other points on the hardware component 10 in addition to the switches, outlets, displays, etc. being exteriorly accessible as represented in FIG. 1.

Further structural and operative features associated with the hardware embodiment of FIGS. 1 and 2 include the mounting structure 14 connected to the housing 12 such as at one end 14' thereof. The opposite end 14" is disposed in outwardly spaced relation from the housing 12 and may include the attachment, mounting or securement of an exposed, signal receiving/detecting portion of the receiver assembly 18, as indicated. Moreover, the mounting structure 14 preferably includes a substantially planar configuration formed of a sufficiently rigid and/or semi-rigid material so as to facilitate support of the housing 12, the first and second power inlets 32 and 34 as well as any wires, cables, cords, etc. of the electrical devices connected to the various outlets 22'-28'. More specifically, the planar configuration of the mounting structure 14 is of sufficient dimension to facilitate the undersurface thereof being disposed in confronting, supported engagement on a shelf or on an electrical device itself.

In such an operative orientation, the side 14", associated with the receiver assembly 18, preferably faces outwardly into the room or area occupied by the user and from which the activating signal or signals are generated by the wireless, remote transmitting unit 20. As such, the exposed face or panel 30 of the housing 12 will be rearwardly oriented so as to be better positioned to receive the various electrical cords, etc. associated with the electrical devices, peripherals, etc. which are connected to the plurality of outlets 22'-28'. Moreover, the planar configuration of the mounting structure 14 and the material from which it is formed also facilitates concurrent or independent placement of some type of supporting structure on an outer exposed surface of the mounting structure 14, concurrent to the undersurface thereof being disposed on a supporting shelf, ledge or other surface. By way of example, an electrical device may be placed on top of mounting structure 14 such that the outer exposed surface thereof engages the under portion of the component. Concurrently, the undersurface of the mounting structure 14 may be resting on a shelf, ledge or other additional supporting structure. The housing 12 attached to the mounting structure 14 will thereby be adequately supported in the aforementioned operative orientation.

With primary reference to the schematic representations of FIGS. 3-6, the various operative components of the current regulating system of the present invention and physically contained within the housing 12 and/or mounting structure 14 are represented. More specifically, FIG. 3 is a schematic representation of a first of the plurality of outlet sections 22 comprising a plurality of electrical outlets 22'. As such, the first outlet section 22 is connected to and powered by a first power input 32 which in turn is electrically connected to a utility main/wall outlet or other appropriate power source, as at 37. In addition, the first outlet 22, as well as the remainder of the plurality of outlet sections 24, 26, 28, etc. includes a surge protection or suppression assembly 39, which may be in the form of a set of metal oxide varistors (MOV). As well recognized a surge protector or surge suppressor 39 is an appliance designed to protect electrical devices from voltage spikes by attempting to regulate the voltage supplied to the electrical device by either blocking or shorting to ground voltages above a safe threshold.

In addition, the receiver assembly 18 is at least partially disposed on the mounting structure 14, as represented in FIG. 2 and is correspondingly structured with the remote control or transmitting unit 20 to receive or detect activating signals. As such, the receiver assembly 18 is operatively connected to the first outlet section 22 and/or the operative circuitry associated therewith so as to regulate current flow thereto of the manner set forth hereinafter. The embodiment of FIG. 3 also includes the schematic representation of the timer assembly 50 including a timer assembly display structure 40 exteriorly viewable and/or accessible on the exposed portion of the face or panel 30 of the housing 20. Additional features of the timer assembly 50 include a timer device 52 and appropriate timer circuitry 54 operatively associated with the display 40 and timer device 52. As such the timer assembly 50 is operatively connected to the first power input 32 and/or an interconnection between the first power input 32 and the one or more outlets 22' of the first outlet section 22. The timer device 52, in cooperation with the timer circuitry 54, is operative to terminate the current flow connection between the first power input 32 and the one or more outlets 22' upon the expiration of a given time period. Moreover, the timing device 52 in association with the timing circuitry 54 is structured to define a variable range of times comprising a plurality of different, preset lengths of time, such as 30 minutes; 60 minutes; 90 minutes; 120 minutes; etc., collectively represented as 55.

Further, the timing assembly 50, through the operation and structure of the timing circuitry 54, comprises reset capabilities operative with or activated by the receiver assembly 18 and transmitting unit 20 to reestablish a predetermined period of time upon receipt of an activating signal from the remote transmitting unit 20. The aforementioned reset capabilities are more specifically structured to "reset" the length of time remaining before current flow is automatically terminated to the outlets 22'. As such, the time will be "reset" to the last established one of the preset lengths of time as at 55. By way of example, the user of the system may decide to preset the timer device 52 of timer assembly 50, such that current flow to the outlets 22' is automatically terminated after a preset length of time of 60 minutes. After the expiration of, for example 20 minutes, the receiver assembly 18, being operatively connected to the timer device 52 and timer circuitry 54, will automatically reset the time of expiration back to the original 60 minute, upon receipt of any one of a plurality of activating signals from the transmitting unit 20. Accordingly and further by way of example, during the preset 60 minute time period, if the user activates the transmitting unit 20, for any purpose, such as changing the volume, channel, etc. on a connected electrical device, such an activating signal transmitted from the remote control 20 will be detected or received by the receiver assembly 18. As a result, the receiver assembly 18 will cause the timing device 52 to be automatically "reset" to the original 60 minute length of time.

In contrast, if no activating signal is received by the timing device 52 and/or timing circuitry 54 within the reset period of 60 minutes, the current flow connection between the first power input 32 and each of the outlets 22' will be terminated. It is again emphasized that in at least one preferred embodiment of the present invention, the receiver assembly 18 is cooperatively and correspondingly structured with the remote control or transmitting unit 20 in terms of operating on an IR mode or RF mode, such that any one of a plurality of different activity signals (volume, channel changing, pause control, replay, etc.) will serve to automatically reset the timing assembly 50 by virtue of the operative connection of the receiver assembly 18 with the timing device 52 and/or the timing circuitry 54 to assume the original preset length of time (60 minutes).

Other features associated with the timing assembly 50 include an alarm or warning device generally indicated as 57, wherein the timer assembly display 40 will be illuminated or the illuminated color thereof will change through activation of an appropriate LCD assembly 58. This will warn the user that the current flow connection from the first power input 32 to the outlets 22' will be terminated within a predetermined "alarm time" such as 2-5 minutes. Similarly, the alarm assembly 57 may include a speaker which is structured to generate an appropriate alarm or warning sound to warn the user that the predetermined time (60 minutes) is about to expire. It should be apparent that the timer assembly 50 thereby serves to conserve energy capable of being normally consumed by the electrical devices connected to the outlets 22' when the devices associated with such outlets are not being used for a prolonged period.

With primary reference to FIG. 4, the preferred embodiment of the current regulating assembly of the present invention, as represented in the embodiments of FIGS. 1-3, further includes the second outlet section 24 comprising one or more outlets 24'. As with the embodiment of FIG. 3, the one or more outlets 24' are protected by a surge suppressor 39 as described above. Further, the second outlet section 24 is connected to or is correspondingly operative with a switching assembly 60. The switching assembly 60 may be manually activated by external access to the display face or panel 30 or may be operated by remote control such as by receiver 18 being connected thereto. Through either mode of operation, the switching assembly 60 is cooperatively structured with the second outlet section 24 to selectively connect the outlets 24' to either the second power input 34 or the first power input 32. More specifically, the outlets 24' of the second outlet section 24 may normally be interconnected to the second power input 34 which, as set forth above, is associated with the UPS 35. As such, the outlets 24' will be "un-switched" or remain open to supply any of a plurality of electrical devices connected to the outlets 24' with power derived from the utility main/wall outlet 37, and/or through the UPS 35. However, the switching assembly 60 is further structured to be selectively activated to the effect of interconnecting each of the outlet section and each of the outlets 24' to the first power input 32 such as through the timer assembly 50. Therefore, when the plurality of outlets 24' are powered by incoming current from the first power input 32, via the timer assembly 50, the plurality of outlets 24' may be preset to terminate the electrical connection with the first power input 32 upon a preset time expiring (30 minutes, 60 minutes, 90 minutes, 120 minutes, etc.) as described in detail with the embodiment of FIG. 3.

Versatility of the current regulating system of the present invention is further enhanced through the provision of a third outlet section 26 including at least one, but more practically a plurality of outlets 26'. As with the remaining of the plurality of outlet sections 22, 24, and 28, the plurality of outlets 26' are protected by a surge suppressor or surge protector 39 structured in the manner described above. In normal operation, the plurality of outlets 26' are powered by a current flow connection with the second power input 34. As also set forth above, an appropriate UPS facility 35 is associated with the second power input 34 and with the utility main/wall outlet power connection 37. Therefore, the one or more outlets 26' of the third outlet section 26 will remain unswitched and continuously open in order to assure that power is supplied on a continuous basis to any electrical device(s) connected to the outlets 26'. It is of course recognized that numerous devices are best operated under continuous power conditions, whether activated or not. Such continuous power conditions are at least partially maintained for the purpose of assuring that data or other operating characteristics of the connected devices are not lost.

It is also contemplated that the one or more outlets 26' of the third outlet section 26 may be connected in current flowing relation to the first outlet 32 in a manner which bypasses the structural and operative features of the timer assembly 50. In such a modification of the embodiment of FIG. 5, constant current flow will be maintained to the one or more outlets 26' in order to maintain any electrical devices connected thereto under a constant power mode.

Figure 6:
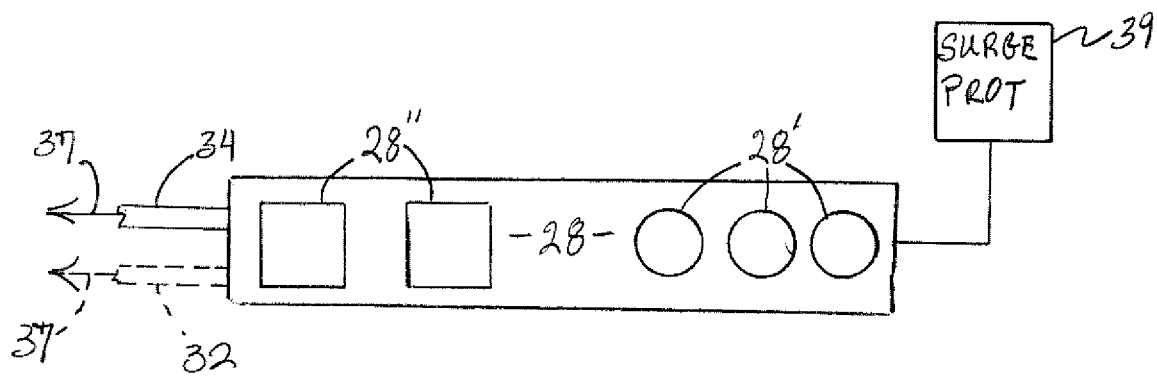
FIG. 6 is a schematic representation of yet additional operative components associated with the embodiments of the system of the present invention, as represented in FIGS. 1-5.

As represented in the embodiment of FIG. 6, the plurality of outlet sections further includes a supplementary outlet section 28 preferably connected to the second power input 34 or alternatively connected to the first power input 32 without access to or activation by the timer assembly 50. As such, the supplementary outlet section 28 includes a variety of different outlet connections 28' including outlets 28", which are adapted to receive and establish electrical connection with coaxial type connectors and electrical telephone lines as at 28' and 28" respectively. In each instance, the outlets 28' and 28" will be protected by a surge protector 39 in the manner set forth above.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A system for regulating current flow to a plurality of electrical devices, said control system comprising:
    a control assembly connected to at least a first power input and a second power input,
    said control assembly comprising a plurality of outlet sections;
    each of said plurality of outlet sections comprising at least one outlet structured for electrical connection of one of the electrical devices to a predetermined one of said first or second power input,
    a timing assembly operatively structured for time based regulation of current flow from said first power input to at least a first of said plurality of outlet sections,
    a second of said outlet sections including switching capabilities structured for selective current flow connection with said first power input or said second power input, and
    a receiver assembly operatively connected to at least said timing assembly and structured for wireless, operative communication with a remote transmitting unit.

2. A system as recited in claim 1 wherein said plurality of outlet sections further includes a third outlet section electrically connected to said second power input.

3. A system as recited in claim 2 further comprising an uninterruptible power supply associated with said second power input and electrically connected to said third outlet section.

4. A system as recited in claim 2 wherein said third outlet section comprises at least one unswitched outlet structured to establish uninterrupted current flow from said second power input to a corresponding electrical device.

5. A system as recited in claim 1 wherein said timing assembly is structured to terminate current flow between said first power input and said first outlet section upon expiration of a predetermined time period.

6. A system as recited in claim 5 wherein said timing assembly comprises reset capabilities operative with said receiver assembly to reestablish said predetermined time period upon receipt, by said receiver assembly, of an activating signal from the remote transmitting unit.

7. A system as recited in claim 5 wherein said timing assembly comprises reset capabilities operative with said receiver assembly to reestablish said predetermined time period upon detection, by said receiver assembly, of any one of a plurality of different activating signals.

8. A system as recited in claim 1 wherein said timing assembly comprises a timer device operative to selectively establish a preset time.

9. A system as recited in claim 8 wherein said timer device is structured for selective establishment of any one of a plurality of preset times.

10. A system as recited in claim 9 wherein said timer device is further structured for automatic reset and cooperative with said receiver assembly to reestablish a selected one of said preset times.

11. A system as recited in claim 1 wherein said plurality of outlet sections further comprise a supplementary outlet section structured for connection to coaxial connectors.

12. A system as recited in claim 11 wherein said supplementary outlet section is further structured for connection to a telephone line.

13. A system as recited in claim 1 further comprising a housing structured and dimensioned for at least partial containment of said control assembly, said housing having said first and second power inputs connected thereto and including said plurality of outlet sections disposed in an exteriorly exposed location thereon; a mounting structure connected to said housing and being dimensioned and configured to dispose said housing and said receiver assembly in a predetermined operative orientation on a supporting structure.

14. A system as recited in claim 13 wherein said mounting structure comprises a planar configuration including one side connected to said housing and extending transversely outward therefrom; said planar configuration being of sufficient dimension to confront the supporting structure on either an outer surface or an undersurface thereof, while maintaining said housing and said receiver assembly in said operative orientation.

15. A system as recited in claim 14 wherein said receiver assembly is at least partially mounted in an exterior, exposed location adjacent on opposite side of said mounting structure relative to said housing.

16. A system for regulating current flow to a plurality of electrical devices and at least partially operative by wireless remote control, said control system comprising:
   a control assembly connected to at least a first power input and a second power input,
   said control assembly comprising a plurality of outlet sections each comprising at least one outlet structured for electrical connection of one of the electrical devices to a predetermined one of said first and second power inputs,
   a timing assembly operatively structured for time based regulation of current flow from said first power input to at least a first of said plurality of outlet sections,
   a second of said plurality of outlet sections including switching capabilities structured for selective current flow connection with said first power input or said second power input,
   said plurality of outlet sections further including a third outlet section electrically connected to one of said first or second power inputs and including an uninterruptible power supply associated therewith, and
   a receiver assembly operatively connected to at least said timing assembly and structured for wireless, operative communication with a remote transmitting unit.

17. A system as recited in claim 16 wherein said timing assembly is structured to terminate current flow between said first power input and said first outlet section upon expiration of a predetermined time period.

18. A system as recited in claim 17 wherein said timing assembly is structured to define a variable range of said predetermined time periods comprising a plurality of preset lengths of time.

19. A system as recited in claim 18 wherein said timing assembly comprises reset capabilities operative with said receiver assembly to reestablish said predetermined time periods upon detection of an activating signal from the remote transmitting unit; said reset capabilities further structured to reset said predetermined time periods to a last established one of said preset lengths of time.

20. A system as recited in claim 16 wherein said plurality of outlet sections further comprise a supplementary outlet section structured for connection to coaxial connectors and telephone lines.

21. A system as recited in claim 16 further comprising a housing structured and dimensioned for at least partial containment of said control assembly, said housing having said first and second power inputs connected thereto and including said plurality of outlet sections disposed in an exteriorly exposed location thereon; a mounting structure connected to said housing and being dimensioned and configured to dispose said housing and said receiver assembly in a predetermined operative orientation relative to a supporting structure.

22. A system as recited in claim 21 wherein said mounting structure comprises a planar configuration including one side connected to said housing and extending transversely outward therefrom; said planar configuration being of sufficient dimension to confront the supporting structure on either an outer surface or an undersurface thereof.

23. A system as recited in claim 22 wherein said receiver assembly is at least partially mounted in an exterior of exposed location adjacent on said mounting structure.

24. A system as recited in claim 16 wherein each of said plurality of outlet sections includes surge suppression capabilities.

* * * * *